(12) United States Patent
Metcalf et al.

(10) Patent No.: US 12,517,121 B2
(45) Date of Patent: Jan. 6, 2026

(54) LAYERED DETECTION DEVICE

(71) Applicant: ConvaTec Limited, Flintshire (GB)

(72) Inventors: Daniel G. Metcalf, Manchester (GB); Manjunath L. Penagondla, Warrington (GB); Stephen Middle, Flintshire (GB); Rocio Burgos Amador, Liverpool (GB)

(73) Assignee: ConvaTec Limited, Flintshire (GB)

( * ) Notice: Subject to any disclaimer, the term of this patent is extended or adjusted under 35 U.S.C. 154(b) by 762 days.

(21) Appl. No.: 17/671,921

(22) Filed: Feb. 15, 2022

(65) Prior Publication Data
US 2022/0260562 A1   Aug. 18, 2022

Related U.S. Application Data

(63) Continuation of application No. PCT/GB2022/050398, filed on Feb. 15, 2022.

(30) Foreign Application Priority Data

Feb. 16, 2021 (GB) ..................................... 2102163

(51) Int. Cl.
G01N 1/00 (2006.01)
B01L 3/00 (2006.01)
G01N 33/543 (2006.01)

(52) U.S. Cl.
CPC ...... *G01N 33/54388* (2021.08); *B01L 3/5023* (2013.01); *B01L 3/5029* (2013.01); *B01L 2300/069* (2013.01)

(58) Field of Classification Search
None
See application file for complete search history.

(56) References Cited

U.S. PATENT DOCUMENTS 2,666,018 A   1/1954   Roland et al.
5,082,516 A   1/1992   Akao et al.
(Continued)

FOREIGN PATENT DOCUMENTS

EP   2881471 A1   6/2015
EP   2666018 B1   4/2017
(Continued)

OTHER PUBLICATIONS

Intellectual Property Office, GB Search Report of Application No. GB2102163.9; Search Date: Oct. 22, 2021, pp. 2.
(Continued)

*Primary Examiner* — Jyoti Nagpaul
(74) *Attorney, Agent, or Firm* — TAFT STETTINIUS HOLLISTER LLP; Ryan O. White; Derek B. Lavender

(57) ABSTRACT

A biomarker detection device having a detection layer configured to detect one or more biomarkers in a biological sample and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window. The detection layer may comprise two or more detection zones. The biomarker detection device may be part of a medical device, such as a swab receptacle. The device may comprise any one or more of: an adhesive layer, a label comprising a printed marking, a fixing element configured to attach or adhere the device to another object.

17 Claims, 4 Drawing Sheets

(56) References Cited

U.S. PATENT DOCUMENTS

| | | | |
|---|---|---|---|
| 5,110,724 | A | 5/1992 | Hewett |
| 5,424,035 | A | 6/1995 | Hones et al. |
| 5,968,836 | A | 10/1999 | Martzinger et al. |
| 6,506,575 | B1 | 1/2003 | Knappe et al. |
| 6,524,864 | B2 | 2/2003 | Fernandez Decastro |
| 8,388,907 | B2 | 3/2013 | Gold et al. |
| 2019/0142642 | A1* | 5/2019 | Burnet .................. A61L 15/38 |
| | | | 600/362 |

FOREIGN PATENT DOCUMENTS

| | | |
|---|---|---|
| GB | 2102163.9 B2 | 1/1983 |
| WO | 2010133589 A1 | 11/2010 |
| WO | 2017168249 A3 | 10/2017 |
| WO | 2017173069 A1 | 10/2017 |
| WO | 2017212345 A2 | 12/2017 |
| WO | 2020250037 A1 | 12/2020 |

OTHER PUBLICATIONS

Expert Review of Molecular Diagnostics Article; Enzyme-responsive polymers for microbial infection detection; Publisher Taylor & Frances; Published: Aug. 2015; pp. 1-8; Link: http://dx.doi.org/10.1586/14737159.2015.1061935; Authors: Schiffer, Tegl, Heinzle, Sigl, Metcalf, Bowler, Burnet, and Guebitz.
International Preliminary Report on Patentability for PCT/GB2022/050398; Dated Sep. 5, 2023; 9 Pages.

* cited by examiner

LAYERED DETECTION DEVICE

CROSS-REFERENCE TO RELATED DISCLOSURES

The present disclosure is a continuation of International Application No. PCT/GB2022/050398 filed on Feb. 15, 2022 and claims the benefit of GB2102163.9 filed on Feb. 16, 2021, the contents of which are hereby incorporated herein in entirety.

TECHNICAL FIELD OF THE INVENTION

The present invention relates to detection devices. In particular to layered detection devices for detection of one or more biomarkers in a biological sample/analyte.

BACKGROUND TO THE INVENTION

Biomarkers are naturally occurring molecules which can be used to identify biological processes, diseases, or medical conditions. As such, they are extremely useful in a wide range of applications such as in medicine. Accurate detection of biomarkers is therefore very important if biomarkers are to be used to diagnose a patient and provide treatment.

Existing biomarker detection devices have been developed that are integrated within a medical device, such as a wound dressing, to provide near-immediate detection of a particular biomarker. These devices typically work by recognising the biomarker through a bio-chemical reaction within a detection region of the device. Successful detection can then be assessed by a change in the device caused by the reaction, for example a visual change. For example, WO2017/173069 discloses a device comprising a reaction layer adhered to a bottom layer by an adhesive layer. The adhesive layer is the same shape as the reaction layer to ensure exact fixation.

The reactions used to detect a biomarker are complex bio-chemical processes that are very sensitive to their environment. In addition, the visual change in the device caused by the reaction can also be a complex process that is strongly dependent on the local environment. Where the environment is not optimised for the detection and visualisation processes this can lead to inaccurate biomarker detection and/or interpretation of the detection result. These problems can be exacerbated where the detection devices are integrated within other devices and must therefore be small.

Depending on the application of a detection device, it may need to be small so that it may fit within a swab tube, medical device tubing, or wound dressing. The reduced physical size of the device can make it hard to observe any changes in the device that indicate the detection of a biomarker.

There is therefore a need for biomarker detection in which the detection reactions are provided in an environment that is more conducive to accurate detection of a biomarker and visualisation of the detection result, ideally while maintaining a small form factor suitable for integration into other medical devices.

It is the object of embodiments of the present invention to at least partially overcome the above issues.

SUMMARY OF THE INVENTION

According to a first broad aspect of the present invention there is provided a detection device comprising: a detection layer configured to detect one or more markers in a biological sample or analyte; and a transfer layer in direct contact with a first surface of the detection layer, wherein the transfer layer is configured to deliver the biological sample or analyte directly to the detection layer.

The biological sample may be an analyte; the terms biological sample and analyte may be used interchangeably herein. A biological sample may be defined as a biological material acquired or derived from living or deceased beings, including but not limited to the following: human (or animal) tissue—fresh, frozen, fixed or processed (e.g., sectioned); all human (or animal) blood (e.g., peripheral or umbilical cord) and blood by-products (e.g., serum, plasma, buffy coat); all human (or animal) biofluids (e.g., sputum, urine, bile); human (or animal) primary cells derived from a human (or animal) body; DNA derived from individual donors.

According to another aspect of the present invention there is provided a biomarker detection device comprising: a detection layer configured to detect one or more biomarkers in an analyte; and a transfer layer in direct contact with a first surface of the detection layer, wherein the transfer layer is configured to deliver the analyte directly to the detection layer and an observation window is provided on a second surface of the detection layer opposite the transfer layer.

According to a second aspect of the present invention there is provided a biomarker detection device comprising: a detection layer configured to detect one or more biomarkers in a biological sample; and a transfer layer in direct contact with a first surface of the detection layer, wherein the transfer layer is configured to deliver the biological sample directly to the detection layer and an observation window is provided on a second surface of the detection layer opposite the transfer layer.

Notably, the transfer layer is configured to deliver a biological sample directly to the detection layer, i.e., not through an intervening adhesive layer. As such, preferably there is no adhesive between the transfer layer and the detection layer in the region in register with the observation window. Moreover, the observation window is free of adhesive.

Thus, as the transfer layer and detection layer are in direct contact, a biomarker is delivered to the detection layer without passing through an intermediate adhesive layer that may obstruct passage of the biological sample. The absence of additional layers between eh transfer layer and the detection layer also avoids introduction of additional chemicals or substances to the detection layer, which could obstruct or interfere with the operation of the detection layer (e.g., interfering with a colour change that occurs on detection). This improves the performance of the detection layer as the reaction environment is better optimised for detecting the one or more biomarkers, and also ensures the resultant change in the detection layer is more predictable and consistent.

As the device can be constructed of only a few layers of material and does not require a dedicated fluid connection component between the transfer and detection layers, it is also of low complexity and can be easily manufactured and integrated into medical devices such as wound dressings, or swab receptables. This allows for in-situ detection of biomarkers in a wide range of applications.

The transfer layer and detection layer may be bonded together at a location that is out of register with the observation window. Preferably, the transfer layer and detection layer are not bonded together at all where they are in register with the observation window—this ensures the bonding does not interfere with the region where the detection result will be seen. In less preferred embodiments, the transfer layer and the detection layer are not bonded together at least in the majority of the region where they are in register with the observation window, or, in increasing preferability they are not bonded together in at least 50%, 60%, 70%, 80%, 90%, 95%, or 99% of the region in register with the observation window. In one example, there may be no adhesive between the transfer layer and the detection layer in the region in register with the observation window. Thus a physical connection between the transfer and detection layers is provided to ensure contact between the layers while minimising the effect of the bond on the detection of the biomarker and interpretation of any changes in the detection layer resulting from the biomarker detection.

A bonding force between the transfer layer and detection layer may be provided out of register with the observation window. Less than 30%, 20%, 10%, 5%, 1%, or 0.5% of the total bonding force provided between the transfer layer and detection layer may be provided in the region in register with the observation window. Thus, the detection layer and transfer layer are bonded together at locations outside the observation window ensuring the bonding mechanism does not affect biomarker detection.

The transfer layer may comprise a first surface and a second surface on opposite sides of the transfer layer. The first surface of the transfer layer may be configured to receive the biological sample into the transfer layer. The second surface of the transfer layer may be configured to deliver the biological sample to the detection layer. The detection layer may comprise a first surface and a second surface on opposite sides of the detection layer. The first surface of the detection layer may be configured to receive the biological sample into the detection layer from the transfer layer. The second surface of the detection layer may be an observation surface configured to allow changes in the detection layer to be observed. At least part of the second surface of the transfer layer may be in direct contact with the first surface of the detection layer. Thus, the biological sample is delivered directly from the transfer layer to the detection layer without passing through intermediate materials.

Only part of the second surface of the transfer layer may be bonded to the detection layer. Thus, as only part of the second surface of the transfer layer is bonded to the detection layer, the biological sample and one or more biomarkers may pass directly from the transfer layer to the detection layer in unbonded regions without being impeded by the bonding mechanism.

Only part of the second surface of the detection layer may be bonded to the transfer layer. Only part of the second surface of the detection layer may be bonded to part of the second surface of the transfer layer. The second surfaces of the transfer and detection layers may not be in direct contact. Thus, with the detection layer and transfer layer bonded together by their second surfaces, the bond does not affect the first surface of the detection layer through with the biomarker is introduced to the detection layer.

The device may comprise an adhesive layer provided on only part of the second surface of the detection layer. The observation window may comprise an opening in the adhesive layer. Thus, observation of a change in the detection layer is not affected by the adhesive layer.

The adhesive layer may bond to the detection layer and the transfer layer. The adhesive layer may bond the second surface of the detection layer to part of the second surface of the transfer layer. The transfer layer may extend beyond at least one edge of the detection layer. The adhesive layer may bond to the transfer layer beyond at least one edge of the detection layer. Thus, the adhesive layer bonds the transfer and detection layers together by their respective second surfaces, this reduces the possibility of adhesive interacting with the biological sample because the biological sample does not pass through the adhesive when entering the detection layer. As an alternative (or in addition) to an adhesive layer, the invention contemplates heat bonding, stitch bonding, or mechanically clamping the transfer layer to the detection layer, for example around their outer edges.

The device may further comprise a label. The label may be bonded to the second surface of the detection layer. The label may be a layer. The label may be bonded to the detection layer by the adhesive layer. The observation window may comprise an opening in the label (and the adhesive layer if present). Accordingly there is provided a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer comprises a first surface configured to receive the biological sample into the transfer layer and a second surface configured to deliver the biological sample to the detection layer, and the first surface of the detection layer is configured to receive the biological sample into the detection layer from the transfer layer, wherein at least part of the second surface of the transfer layer is in direct contact with the first surface of the detection layer, wherein only part of the second surface of the transfer layer is bonded to only part of the second surface of the detection layer, wherein the device further comprises an adhesive layer provided on only part of the second surface of the detection layer, wherein the observation window comprises an opening in the adhesive layer, wherein the device further comprises a label bonded to the second surface of the detection layer by the adhesive layer, wherein the observation window comprises an opening in the label.

The label may comprise a marking, e.g., a printed marking, such as a reference colour, or symbol/text, to aid interpretation of biomarker detection by the detection layer. Accordingly there is provided a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer comprises a first surface configured to receive the biological sample into the transfer layer and a second surface configured to deliver the biological sample to the detection layer, and the first surface of the detection layer is configured to receive the biological sample into the detection layer from the transfer layer, wherein at least part of the second surface of the transfer layer is in direct contact with the first surface of the detection layer, wherein only part of the second surface of the transfer layer is bonded to only part of the second surface of the detection layer, wherein the device further comprises an adhesive layer provided on only part of the second surface of the detection layer, wherein the observation window comprises an opening in the adhesive layer, wherein the device further comprises a label bonded to the second surface of the detection layer by the adhesive layer, wherein the observation window comprises an opening in the label, wherein the label comprises a printed marking.

The label may be stiffer and/or stronger than the adhesive layer, and/or than the detection layer, and/or than the transfer layers. Thus, a label can be provided on the device which reduces the risk of misinterpretation of the result. The label may also provide structural support to the device if necessary. In particular, the provision of a label layer can provide additional structural stability to the adhesive layer that bonds the second surface of the detection layer to the second surface of the transfer layer.

The detection layer may be configured to change colour in response to the presence of the one or more biomarkers. For example, the colour change may be chromogenic. The marking may include the possible colours that the detection layer may display in response to the presence of the one or more predetermined biomarkers. Thus, the device provides simple visual interpretation of the detection result. The marking may additionally or alternatively indicate which one or more predetermined biomarker the detection layer detects.

The device may further comprise a fixing element. The fixing element may be provided at an outer surface of the device, for example, the label. The fixing element may be configured to attach or adhere the device to another object, such as part of a medical device. Accordingly there is provided a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer comprises a first surface configured to receive the biological sample into the transfer layer and a second surface configured to deliver the biological sample to the detection layer, and the first surface of the detection layer is configured to receive the biological sample into the detection layer from the transfer layer, wherein at least part of the second surface of the transfer layer is in direct contact with the first surface of the detection layer, wherein only part of the second surface of the transfer layer is bonded to only part of the second surface of the detection layer, wherein the device further comprises an adhesive layer provided on only part of the second surface of the detection layer, wherein the observation window comprises an opening in the adhesive layer, wherein the device further comprises a fixing element configured to attach or adhere the device to another object.

The fixing element may be an adhesive layer on a surface of the label opposite the detection layer. The fixing element may comprise an adhesive, or any other suitable surface that can provide fixation, such as one element of a hook and loop, or hook and hook seal, or a magnetic surface to be attracted to a corresponding magnetic surface on another device. The fixing element may be shaped to correspond with a fitting element so that the detection device may be attached to an object containing the fitting element. For example, through a push-fit, bayonet, or screw fitting, or similar. The fixing element may comprise a removeable liner, such as a release layer. Accordingly there is provided a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer comprises a first surface configured to receive the biological sample into the transfer layer and a second surface configured to deliver the biological sample to the detection layer, and the first surface of the detection layer is configured to receive the biological sample into the detection layer from the transfer layer, wherein at least part of the second surface of the transfer layer is in direct contact with the first surface of the detection layer, wherein only part of the second surface of the transfer layer is bonded to only part of the second surface of the detection layer, wherein the device further comprises an adhesive layer provided on only part of the second surface of the detection layer, wherein the observation window comprises an opening in the adhesive layer, wherein the device further comprises a fixing element configured to attach or adhere the device to another object, wherein the fixing element comprises an adhesive layer and a releasable liner. The liner may prevent the device being fixed to an object until the liner is removed, and prevent access to the observation window until the liner is removed. Thus, in embodiments with the fixing element, the device can be conveniently fixed to other objects such as medical devices to provide in-situ biomarker detection, the releasable liner further prevents tampering or interference with the device by protecting the observation window until use.

The observation window may comprise openings in any one or more of the adhesive layer, label, and fixing element. Where the fixing element comprises a releasable liner, the releasable liner may be configured to cover the openings. Each opening may be in substantially the same position. Each opening may be substantially the same shape and size. Alternatively, the openings may be of different shapes or sizes, provided they are sufficiently aligned that there is a clear "line of sight" un-obscured by any of the adhesive layer, label or fixing element. Thus, the observation of the detection layer through the observation window is not obscured or altered by any of the adhesive layer, label, or fixing element. The observation window thus ensures that the section of the detection layer in which a change may be observed does not itself comprise additional unnecessary material that could change the detection layer's appearance. Furthermore, the observation window allows for direct assessment of the change in the detection layer without additional unnecessary material potentially obscuring the layer and causing misinterpretation of the result.

In one embodiment, the device comprises an adhesive layer, label, and fixing element, wherein the fixing element is an outer adhesive layer applied to a surface of the label opposite the detection layer, and the observation window comprises openings in the adhesive layer, label and, outer adhesive layer, and wherein the openings are all in substantially the same position and are preferably substantially the same shape and size.

The device and/or layers of the device may be any suitable shape, for example an irregular polygon or regular polygon, such as a square, a rectangle, a circle, or an ellipse. Alternatively, the device and/or layers of the device may be an arbitrary 2D shape. The shape of the device and/or layers of the device may coincide with branding or a brand logo, or may coincide with the shape of a medical device in which the detection device is intended to be integrated. The transfer layer and/or detection layer and/or observation window may be the same shape, or may be different shapes.

The device and/or layers of the device may be any suitable size. The transfer layer may define the size and/or shape of the device. The transfer layer may be larger than the detection layer. The detection layer may be larger than the observation window. The transfer layer may have an area at least 2, 3, 4, 5, or 6 times the area of the detection layer. The detection layer may have an area of at least 10 mm$^2$, 20 mm$^2$, 30 mm$^2$, 50 mm$^2$, or 100 mm$^2$. The detection layer may have an area less than 100 mm$^2$, 50 mm$^2$, 30 mm$^2$, or 20 mm$^2$. The observation window may have an area of at least 2 mm$^2$, 6 mm$^2$, 10 mm$^2$, 20 mm$^2$, or 50 mm$^2$. The observation window may have an area less than 50 mm$^2$, 20 mm$^2$, 10 mm$^2$, or 6 mm$^2$. Where the device comprises a label, the label and the transfer layer may be the same size and shape.

The detection layer may comprise at least two detection zones, for example three or more detection zones. The detection zones may be laterally adjacent to one another. The detection zones may be arranged in any suitable shape, for example along a line or along the circumference of a circle. Each detection zone may be configured to detect a different set of one or more biomarkers. One or more of the detection zones may be configured to detect the presence of the biological sample, that is one or more detection zones may be a control zone, thus providing a check to show the biological sample has successfully penetrated the detection layer. One or more detection zones may be configured to (separately) detect the presence of the biological sample and whether the biological sample comprises one or more biomarkers. That is to say, a single zone may detect both the presence of a biological sample and whether it comprises one or more biomarkers. In particular, a single detection zone may change from a first colour to a second colour in the presence of a biological sample not containing one or more biomarkers and from the first colour to a third colour in the presence of one or more biomarkers. In a specific example, the single zone may comprise a pH responsive composition and change from the first colour to the second in the presence of a biological sample in a "normal" state and from the first colour to the third colour in the presence of a biological sample having a biomarker (i.e. elevated or reduced pH) associated with an infected wound.

The device may comprise at least two observation windows, for example three or more observation windows. Each observation window may correspond to a respective detection zone. In one embodiment, the detection layer comprises three detection zones, and three observation windows, wherein each observation window corresponds to a respective detection zone. The detection zones are preferably positioned laterally relative to one another in a line. Thus, the device can be arranged to detect multiple different sets of biomarkers simultaneously allowing for complex detection of one or more medical conditions or diseases.

Each detection zone may be provided by an independent detection segment. The independent detection segments may thus, together form the detection layer. Each independent detection segment may be independently bonded to (and in direct contact with) the transfer layer. The detection segments may be adjacent (to provide a small form-factor) or spaced from one another (to avoid unintended interaction between the compositions in the segments). The spacing between adjacent detection segments may be at least 0.5 mm, 1.0 mm, 1.5 mm, 2.0 mm, 4.0 mm, or 10 mm. The spacing between adjacent detection segments may be less than 10 mm, 4.0 mm, 2.0 mm, 1.5 mm, or 1.0 mm. Each detection segment may have an area of at least 10 mm$^2$, 20 mm$^2$, 30 mm$^2$, 50 mm$^2$, or 100 mm$^2$. Each detection segment may have an area less than 100 mm$^2$, 50 mm$^2$, 30 mm$^2$, or 20 mm$^2$.

The transfer layer may be configured to distribute the biological sample to each detection zone. Thus, the transfer layer ensures each detection zone is supplied with a sufficient amount of the biological sample.

The transfer layer may be bonded to the detection layer between adjacent detection zones. One or more gaps may be provided between adjacent observation windows. Each gap may be at least 1, 2, 3, 4 or 5 times the width of each observation window as measured in the same direction as the gap. Each gap may be at least 0.5 mm, 1.0 mm, 1.5 mm, 2.0 mm, 5 mm, 10 mm or 20 mm. Each gap may be less than 30 mm, 20 mm, 10 mm, 5 mm, 2.5 mm, 1.5 mm, or 1.0 mm. Each gap may be the same size or may vary in size depending on the device construction and detection zone configuration. The transfer layer may be bonded to the detection layer in the one or more gaps. Thus, the transfer layer and detection layer are bonded between adjacent detection zones to ensure direct contact between the transfer layer and detection layer is provided in each detection zone. Advantageously, the bonding is only present in the gaps between each observation window ensuring the bonding does not affect the detection results.

The detection layer may be formed from one or more biomarker detection strips, for example the detection segments may be cut from a biomarker detection strip. Each detection zone may be provided by a respective biomarker detection strip.

The biomarkers detected by embodiments of the present invention may represent any indicator of a normal biological process, pathogenic process, or pharmacological response. One or more of the biomarkers may be a biomarker known to be present in an infected or chronic wound, or related to any of the following: neutrophil activity; macrophage activity; white blood cell activity; innate immune system activity, such as patient neutrophil/macrophage/white blood cell enzyme activity, protease activity, peroxidase activity, and pH/acidity/alkalinity; microbial activity, such as bacterial, fungal or biofilm activity; pathogen activity, such as microbial/bacterial/fungal/pathogen presence, contamination or colonisation; inflammation, such as bacteria-related, pathogen-related or biofilm related inflammation; chronicity, such as bacteria-related, pathogen-related or biofilm-related chronicity; infection, such as local or spreading infections; and, sepsis. Examples of suitable biomarkers include: proteins, such as granulocyte-macrophage colony-stimulating factor, fibrin; enzymes, such as myeloperoxidase, neutrophil elastase, lysozyme, cathepsin G, elastase, lipase, esterase, catalase, Proteinase 3, gelatinase, collagenase, matrix metalloproteinases, stromolysins, matrilysins, alkinaine, lipocalins, phosphatase superoxide dismutase, NAPPH oxidase, haem oxygenase; cytokines; interleukins; antibodies; cells (prokaryotic or eukaryotic); viruses; microbial enzymes such as ZapA/serralysin (from *Proteus mirabilis*); LasB/protease, Proteinase K, LipA/lipase, LasA/protease or Para/serralysin (*Pseudomonas aeruginosa*); hyaluronidase (*Streptococcus* spp); gelatinase/hyaluronidase (*Enterococcus* spp); V8 protease/peptidase I or hylauronidase (*Staphylococcal* spp); hyaluronidase or HlyA toxin (*Bacteriodes* spp); phospholipase D (*Acinetobacter baumannii*); pH; or any suitable biomarker or combination of biomarkers.

A detection zone may be a control zone configured to detect the presence of the biological sample. In one example, the control zone may be configured to detect the pH of the biological sample and thus any colour change of the control zone indicates the biological sample's presence in the detection layer. Thus, the user is presented with a simple visual check that shows if the device is functioning.

In one embodiment, the detection device is configured to detect three different biomarkers: myeloperoxidase, neutrophil elastase and pH. Each biomarker may be detected by an independent biomarker detection segment. Thus, the pH detection segment can be both a control zone, and also indicate if a specific pH level is present in the biological sample, for example a pH level indicative of an infection.

The detection layer may be configured to detect one or more biomarkers using one or more reagents. The detection layer may be configured to detect the one or more biomarkers by combining the one or more reagents with the one or more biomarkers in the detection layer. The detection layer may be configured to detect the one or more biomarkers through a reaction between the one or biomarkers and the one or more reagents (in the detection layer). Accordingly, there is provided a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer is configured to release one or more reagents into the biological sample, and wherein the detection layer is configured to detect the one or more biomarkers by combining the one or more reagents with the one or more biomarkers in the detection layer.

Where the biomarker is an enzyme, the reagent may comprise an enzyme-reactive indicator. The transfer layer may be configured to release one or more reagents into the biological sample. The detection layer may be configured to release one or more reagents into the biological sample. The reagents may comprise any one or more: reactants; cofactors; catalysts; chemical substrates; biochemical substrates; and the like. In one embodiment, the reagents may be glucose and glucose oxidase. The transfer layer may be configured to release glucose into the biological sample. The detection layer may be configured to release glucose oxidase into the biological sample. Where the reagents are glucose and/or glucose oxidase, the biomarker may be myeloperoxidase. The detection layer may comprise one or more probes. Each probe may be configured to generate a signal when acted on by one or more biomarkers. Where the biomarker is an enzyme, the probe may comprise a modified enzyme substrate specific to the enzyme. Suitable biomarkers and their detectors and co-reagents are disclosed in WO2017/173069, the content of which is incorporated herein by reference.

Where the detection layer comprises two or more detection zones, the detection layer may be configured to detect the one or more biomarkers using the one or more reagents. The detection layer may be configured to combine the one or more reagents with the one or more biomarkers in one or more of the detection zones. Accordingly example, there is provided a biomarker detection device comprising: a detection layer configured to detect one or more biomarkers in a biological sample and comprising two or more detection zones; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window, wherein the transfer layer is configured to release one or more reagents into the biological sample, and wherein the detection layer is configured to detect the one or more biomarkers using the one or more reagents. Thus, the transfer layer can distribute the sample/analyte and reagents among all detection zones where they can be used to assist detection of the one or more biomarkers in the detection layer/zone.

The transfer layer may be configured to filter the biological sample. The transfer layer may be configured to inhibit parts of the biological sample from migrating to the detection layer. The transfer layer may be configured to thus remove and/or bind parts of the biological sample not required by the detection layer, for example cells, pigments, haemoglobin, debris or the like that could interfere with observation. The transfer layer may be configured to reduce colour changes in the detection layer that result from parts of the biological sample other than the one or more biomarkers. Thus, the transfer layer and detection layer work together to ensure accurate detection of the biomarkers, for example by preventing colour changes in the detection layer due to other constituents of the biological sample.

As outlined above, the detection layer may change colour in response to the presence of a predetermined biomarker. The transfer layer may comprise colour-masking components to enhance the visibility of the colour change of the detection layer or to ensure any colour changes are primarily due to the detection of the one or more biomarkers by the detection layer (and not due to other components of the biological sample) as described above.

The transfer layer and detection layer are preferably formed from filter paper. However in some embodiments, either may be formed from any one of the following: paper, mesh, membrane, film, polymer, polysulfone, resorbable film, bioresorbable film, nitrocellulose, or the like. The transfer layer and detection layer may be formed of the same material, or of different materials. The label may be formed of any of: paper, mesh, film, polymer, plastics, or the like. The transfer layer, and/or detection layer, and/or label may be at least 0.05 mm, 0.1 mm, 0.5 mm, 1 mm, 2 mm, 3 mm, 4 mm, 5 mm thick. The transfer layer, and/or detection layer, and/or label may be less than 10 mm, 8 mm, 6 mm, 4 mm, 2 mm, 1 mm thick. In one example, the transfer layer and detection layers are both 3 mm thick. In another example, the transfer layer is 0.16 mm thick. In one example, the detection layer is between 0.16 mm and 0.18 mm thick.

The adhesive layer is preferably an acrylic-based laminate adhesive; however, many other types of adhesive would also be suitable. For example, the adhesive layer could be any acrylate adhesive, or any fibre-reinforced transfer adhesive. The adhesive layer may be at least 10 µm, 25 µm, 50 µm, 100 µm, 200 µm, 400 µm, 1 mm, 2 mm, or 5 mm thick. The adhesive layer may be less than 5 mm, 2 mm, 1 mm, 400 µm, 200 µm, 100 µm, 50 µm, or 25 µm thick. In one example, the adhesive layer is 60 µm thick.

The label is preferably a plastics material, however, many other types of material could be used, for example paper or card. In one embodiment, the label is comprised of polypropylene (PP) and polyethylene terephthalate (PET). Other plastics materials that the label may comprise include, for example: low density polyethylene (LDPE), metalized polyester (MET PET) or orientated polypropylene (OPP).

According to a third aspect of the present invention, there is provided a medical device comprising the biomarker detection device of the first aspect of the invention or the second aspect of the present invention, optionally including any of the optional features set out above. Accordingly, there is provided a medical device comprising a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window.

The medical device may be a swab receptacle; swab transport tube; or swab device. Accordingly, there is provided a swab receptacle comprising a biomarker detection device comprising: a detection layer configured to detect one or more biomarkers in a biological sample; and a transfer layer in direct contact with a first surface of the detection layer; wherein the transfer layer is configured to deliver the biological sample directly to the detection layer and wherein an observation window is provided on a second surface of the detection layer opposite the transfer layer and wherein there is no adhesive between the transfer layer and the detection layer in the region in register with the observation window. The medical device may be a wound dressing, such as a chronic wound dressing or a surgical/acute wound dressing. The medical device may be a tube, for example a catheter, such as an intermittent or indwelling urinary catheter, an airway catheter, a faecal catheter, or a central venous catheter. The medical device may be negative pressure wound therapy (NWPT) tubing, connectors, pumps and dressings. The medical device may be a wound drain tube, or a surgical drain tube. The medical device may be a wound drain bag, or a surgical drain bag. The medical device may be a NWPT reservoir or other wound drainage device. The medical device may be a debridement device (physical, physio-chemical, powered, or ultrasonic). The medical device may be a cannula, securement device or infusion device (e.g. insulin infusion device). The medical device may be a monitor/monitoring device, such as a glucose monitor. The medical device may be an airway management system. The medical device may a lung flow meter, or a breath flow meter. The medical device may be a face mask. The medical device may be an endotracheal tube, tracheostomy tube, an open suction system airway catheter, or a closed suction system airway catheter. The medial device may be an ostomy appliance or pouch, for example a colostomy, ileostomy, or urostomy appliance. The detection device can therefore be used in a wide variety of applications.

According to a fourth aspect of the present invention there is provided a method of forming a (biomarker) detection device, the method comprising: providing a detection layer configured to detect one or more (bio)markers in a biological sample; providing a transfer layer in direct contact with a first surface of the detection layer (not via an intervening adhesive layer); providing an observation window on a second surface of the detection layer opposite the transfer layer; and bonding the detection layer and transfer layer together (with the observation window being free from adhesive).

The detection device may be a detection device according to any of the first to third aspects of the invention, optionally including any optional features set out above.

According to a fifth aspect of the present invention, there is provided a method of detecting one or more (bio)markers in a biological sample, the method comprising: releasing the biological sample into a transfer layer; delivering the biological sample into a detection layer configured to detect the one or more (bio)markers; and, observing the detection of the one or more biomarkers in the detection layer through an observation window, wherein: the transfer layer is in direct contact with a first surface of the detection layer; and the observation window is provided on a second surface of the detection layer opposite the transfer layer.

Again, the detection device may be a detection device according to any of the first to third aspects of the invention, optionally including any optional features set out above.

The invention also extends to a method of diagnosis based on detection of one or more (bio)markers in a biological sample, the method comprising: releasing the biological sample into a transfer layer; delivering the biological sample into a detection layer configured to detect the one or more (bio)markers; and, observing the detection of the one or more biomarkers in the detection layer through an observation window, wherein: the transfer layer is in direct contact with a first surface of the detection layer; and the observation window is provided on a second surface of the detection layer opposite the transfer layer; the method further comprising identifying a disorder responsible for the observed detection of one or more biomarkers.

Again, the detection device may be a detection device according to any of the first to third aspects of the invention, optionally including any optional features set out above.

Moreover, the invention may extend as far as prescribing a treatment in response to the observed detection of one or more biomarkers.

DETAILED DESCRIPTION OF THE INVENTION

In order that the invention may be more clearly understood one or more embodiments thereof will now be described, by way of example only, with reference to the accompanying drawings, of which:

Figure 1:
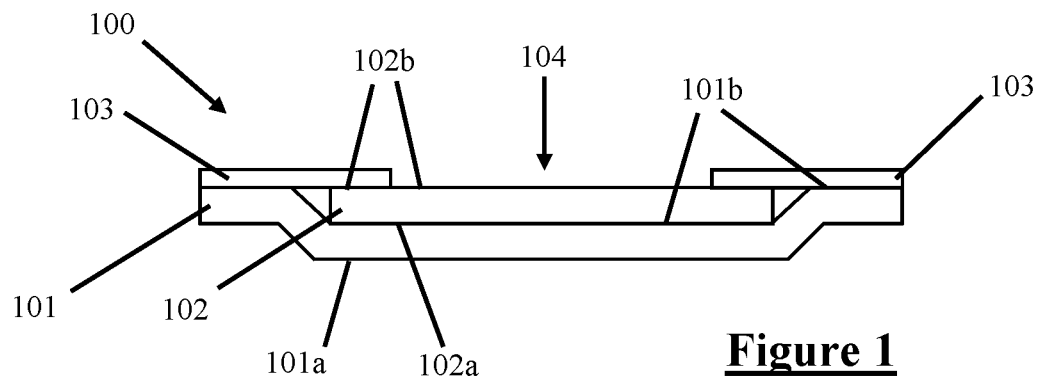
FIG. 1 is a cross-sectional view of a first embodiment of a detection device.

For convenience only, the devices are described with respect to their orientation in the drawings. Obviously, in use, a "top" surface need not be uppermost and so on, no limitation is intended.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Referring to FIG. 1, a first embodiment of a detection device 100 comprises a transfer layer 101, detection layer 102 and an adhesive layer 103 (from bottom to top in that order, as shown in the drawings). The transfer layer 101 comprises a first surface 101a (lowermost in the drawings) and a second surface 101b (uppermost in the drawings) on opposite sides of the transfer layer 101. The detection layer 102 also comprises a first surface 102a (lowermost in the drawings) and a second surface 102b (uppermost in the drawings) on opposite sides of the detection layer 102. The detection layer 102 is arranged on the transfer layer 101 such that the second surface 101b of the transfer layer 101 is in direct contact with the first surface 102a of the detection layer 102.

The transfer layer 101 extends beyond two opposite lateral edges of the detection layer 102. The adhesive layer 103 is applied over the upper surfaces of the transfer layer 101 and the detection layer 102 and as such is arranged to bond to both: the second (upper) surface 102b of the detection layer 102; and the second (upper) surface 101b of the transfer layer 101 where it extends beyond the edges of the detection layer 102. The adhesive layer 103 thereby fixes the transfer layer 101 and detection layer 102 together so that the detection layer 102 is effectively clamped between the transfer layer 101 and the adhesive layer 103. This maintains direct contact between the transfer layer 101 and detection layer 102 without requiring adhesive to be present between them.

The second surface 102b of the detection layer 102 includes an observation window 104. The observation window 104 comprises an opening in the adhesive layer 103 thereby providing an observation surface free from adhesive on the second surface 102b of the detection layer 102, where the upper surface of the detection layer can be viewed.

In use, the first surface 101a of the transfer layer 101 is configured to receive a biological sample which in this embodiment is referred to as an analyte (not shown) for example from a swab (not shown) into the transfer layer 101, and the second surface 101b of the transfer layer 101 is configured to deliver the analyte (which transfers through the transfer layer 101) to the detection layer 102.

The first surface 102a of the detection layer is configured to receive the analyte into the detection layer 102 from the transfer layer 101. The detection layer 102 is configured to detect one or more biomarkers (not shown) in the analyte by undergoing a change in response to the one or more biomarkers. In this embodiment, the detection layer 102 undergoes a qualitative or quantitative colour (chromogenic) change in response to the presence of a predetermined biomarker. In this embodiment, the observation window 104 is configured to allow a user to visualise the change in the detection layer 102. Thus, one or more biomarkers in the analyte may be received and detected by the device 100. In this embodiment, the detection device 100 is a biomarker detection device, but it is conceived that in other embodiments the device 100 may be configured to detect any suitable marker.

Notably, the construction of the device 100 allows the transfer layer 101 to be configured to deliver the analyte directly to the detection layer 102, i.e. not through an intervening layer that may obstruct the analyte, such as an intervening adhesive layer. This improves detection performance in the device 100. Moreover, the observation window 104 is free of adhesive and so the resultant change in the detection layer 102 is clearer.

In this embodiment, the transfer layer 101 is also configured to filter the contents of the analyte and provide reagents to the analyte to assist or enable the biomarker detection process in the detection layer 102. Further information on the biomarker detection process including examples of biomarkers and reagents is disclosed in WO2017/173069, the content of which is incorporated herein by reference.

In this embodiment, the transfer layer 101 and detection layer 102 are comprised of filter paper. The detection layer 102 also comprises biomarker-sensing chromogenic compositions that facilitates detection of the one or more biomarkers. In other embodiments, each layer may comprise a different material, and a variety of materials would be suitable for each layer. For example, paper, mesh, film, polymer, resorbable film, bioresorbable film, or nitrocellulose.

In this embodiment, the adhesive layer 103 is provided by an acrylic adhesive. In other embodiments, any suitable adhesive may be used, for example any acrylate adhesive, or any fibre-reinforced transfer adhesive.

The device 100 can be constructed by cutting glucose filter paper which will form the transfer layer to a suitable size (as an example 1 cm×1 cm square); cutting a detection strip of e.g. 5 mm width to form a 1 cm×5 mm rectangle aligning the detection layer 102 centrally across the transfer layer 101 and applying an adhesive, for example a hot-melt adhesive, to the aligned transfer layer 101 and detection layer 102, such that the adhesive forms two strips at the edges along the transfer layer 101 perpendicular to the length of the detection layer 102, so as to attach its upper surface 102b to the upper surface 101b of the transfer layer 101, whilst leaving the central region free from adhesive to form the observation window.

Figure 2:
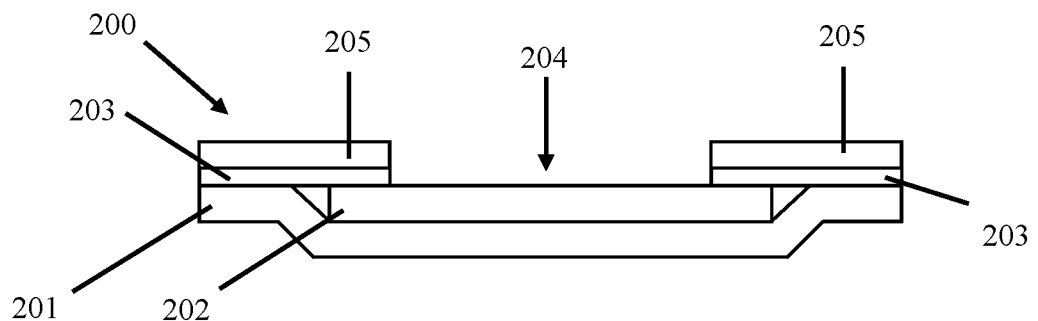
FIG. 2 is a cross-sectional view of a second embodiment of a detection device.
Figure 3:
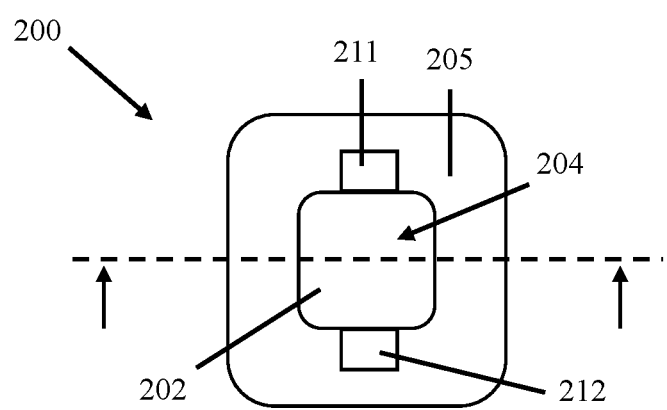
FIG. 3 is a top plan view of the detection device of FIG. 2.

Referring to FIGS. 2 and 3, in a second embodiment of a detection device 200, like numerals are used to show like features. In this embodiment, the detection device 200 is a labelled device 200 and comprises a label 205 bonded to the adhesive layer 203 opposite the detection layer 202 (above it as shown in the drawings).

In this embodiment, the observation window 204 comprises opening in the label 205 and the adhesive layer 203. The respective openings are in the same position and as such ensure the detection layer 202 is not obscured by any unnecessary material.

In this embodiment, the label 205 further comprises two markings 211, 212. The markings 211, 212 are printed markings to aid interpretation of biomarker detection by the detection layer 202. The markings 211, 212 may be coloured to correspond to the colour of the detection layer 202 when a predetermined biomarker is present and/or may identify the predetermined biomarker that causes a colour-change in the detection layer.

In this embodiment, the label 205 is stiff. Thus, the label 205 provides additional structural stability to the adhesive layer 203 that bonds the detection layer 202 to the transfer layer 201, allowing a more flexible or breakable adhesive to be used. In this embodiment, the label 205 comprises polypropylene (PP) and polyethylene terephthalate (PET), in other embodiments different materials may be used such as other plastics, paper, card or metal.

To manufacture the device 200, again the first step is cutting glucose filter paper which will form the transfer layer 201 to a suitable size (as an example 1 cm×1 cm square). Next a detection strip is cut to a suitable size, for example a 5 mm wide strip can be cut to a 10 mm×5 mm rectangular detection segment, the detection segment is aligned to form the detection layer 202 extending centrally across the transfer layer 101.

The label 205 can be cut from a larger laminate including the adhesive and a release liner. It is cut to match the size of the transfer layer 102, with an aperture formed centrally (e.g. using a suitably shaped hole punch) which is smaller than the width of the detection segment forming the detection layer 202, e.g. a 4 mm×4 mm square. The release layer is removed and the label 205 adhered by the adhesive layer 203 to the upper surfaces of the detection layer 202 and the transfer layer 201, to clamp one to the other whilst leaving the central region free from adhesive or label to form the observation window 204.

Figure 4:
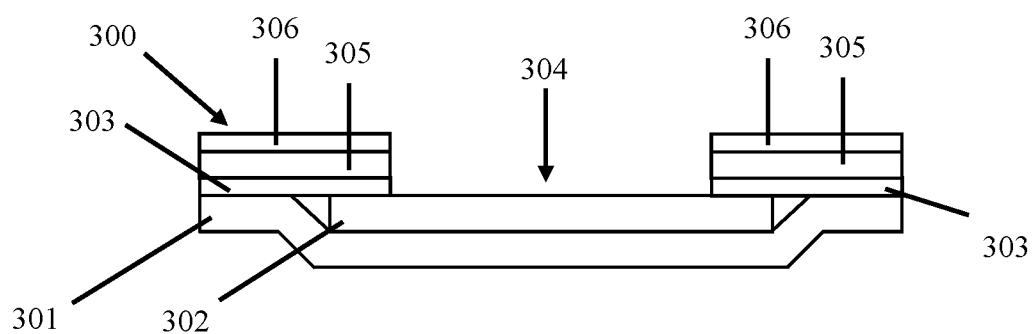
FIG. 4 is a cross-sectional view of a third embodiment of a detection device.
Figure 5:
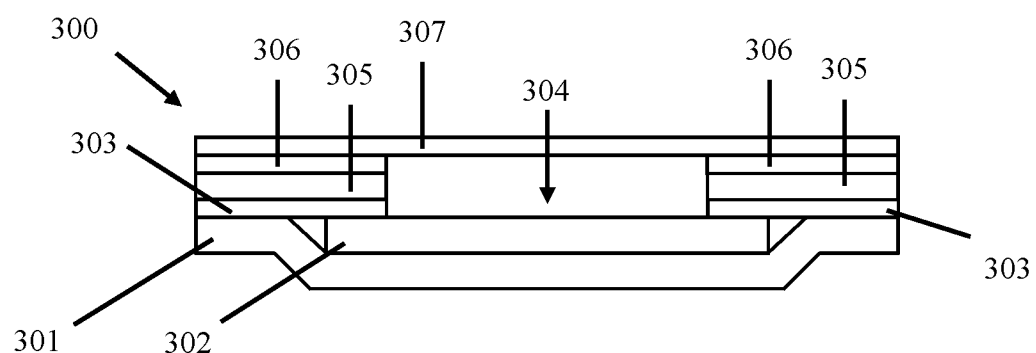
FIG. 5 is a cross-sectional view of the detection device of FIG. 4.

Referring to FIGS. 4-5, in a third embodiment of a detection device 300 like numerals are used to show like features. In this embodiment, the detection device 300 is a self-adhesive device 300 and further comprises a fixing element on a surface of the label 305 opposite the detection layer 302.

In this embodiment, the fixing element comprises an outer adhesive layer 306 bonded to the label 305, and a releasable liner 307 on the outer surface of the outer adhesive layer 306. The outer adhesive layer 306 comprises an opening which forms part of the observation window 304, and is thus in the same position as the opening in the label 305 and adhesive layer 303. In this embodiment, the releasable liner 307 does not comprise a corresponding opening, and as such spans the opening in the outer adhesive layer 306. The releasable liner 307 is thereby configured to prevent access to the detection layer 302 and also prevent the outer adhesive layer 306 from bonding to an object until the device 300 is ready to be used. This ensures the detection layer 302 is not interfered with by foreign objects or dirt, and also that the outer adhesive layer 306 can provide a strong and dependable bond between the device 300 and another object.

In this embodiment, the fixation provided by the fixing element is due to the outer adhesive layer 306 which is provided by an acrylic laminate. In other embodiments, the fixing element may any other suitable surface that can provide fixation, such as other types of adhesive, one element of a hook and loop or hook and hook seal, or a magnetic surface to be attracted to a corresponding magnetic surface on another device. The fixing element may further be shaped to correspond with a fitting element so that the detection device may be attached to an object containing the fitting element. For example, through a push-fit, bayonet, or screw fitting, or similar.

By way of example, in use the device 300 is provided with the releasable liner 307 attached to the outer adhesive layer 306 (see FIG. 5). When the device 300 is ready to be placed into a medical device, the releasable liner 307 is removed exposing the adhesive surface of the outer adhesive layer 306 and the observation window 304 (FIG. 4). The device 300 can then be placed in a medical device where the analyte is received into the transfer layer 301 and biomarkers in the analyte are detected by the detection layer 302.

To manufacture the detection device of the third embodiment, the transfer layer 301, detection layer 302, adhesive layer 303, and label 305 can be built up exactly as described in respect of the second embodiment. An acrylic laminate adhesive with two release layers (one on each side), can then be cut to shape to match the external dimensions and aperture position, shape and size, then the lower release layer removed and the adhesive carefully applied in register with the other layers. The upper release layer (with an aperture therein) can then be removed and a replacement release layer applied that covers the observation window.

Figure 6:
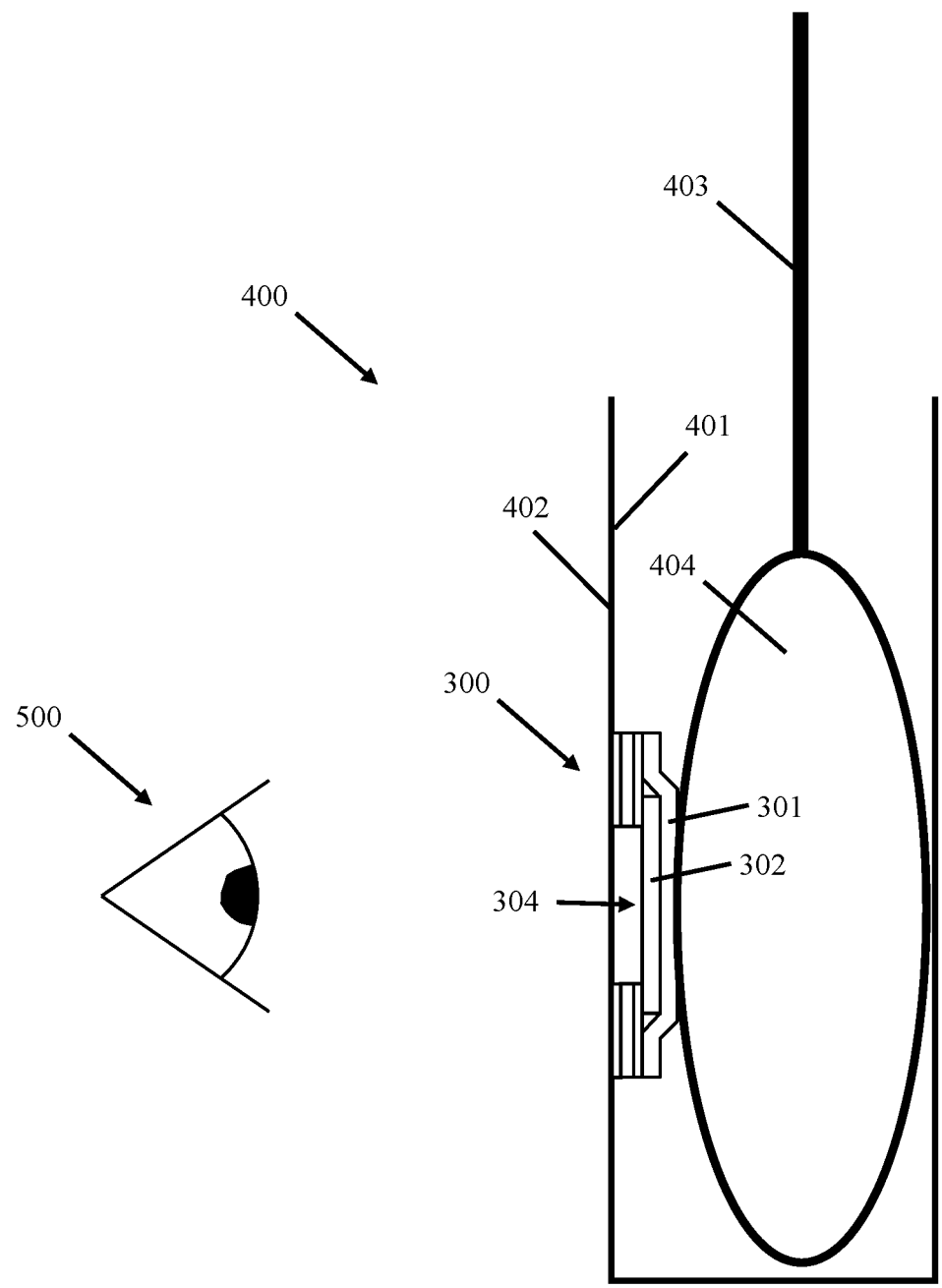
FIG. 6 is a cross-sectional view of the detection device of FIG. 4 in use in a medical device.

Referring to FIG. 6, the releasable liner 307 has been removed and device 300 is placed within a swab receptacle 400. The swab receptacle 400 comprises a transparent tube sized to receive and retain a swab. The device 300 is adhered to an inner surface 401 of a sidewall of the receptacle 400 by the outer adhesive layer 306. As the sidewall is transparent, the detection layer 302 is therefore visible to an observer 500 through an outer surface 402 of the sidewall and the observation window 304.

The swab is of the type standard in medical professions and comprises an elongate handle 403 connected to an ellipsoidal tip 404. In use, the analyte is picked up by the tip 404, and the tip 404 is then placed into the receptacle 400. The device 300 is positioned such that the tip 404 contacts the first surface 301a of the transfer layer 301. As such, the analyte is received by the transfer layer 301 of the device 300. The analyte is then transferred by the transfer layer 301 to the detection layer 302 and subsequent detection of one or more biomarkers in the analyte may be visualised by the observer 500, in response to a colour-change.

While this embodiment describes the device 300 as placed within a swab receptacle 400, the device 300 could similarly be placed in a wide variety of medical devices. Furthermore, it could be integrated with a medical device during manufacture. Suitable medical devices include: a swab transport tube; swab device; a wound dressing; a chronic wound dressing; a surgical/acute wound dressing; a tube, for example a catheter, or negative pressure wound therapy (NWPT) tubing; a NWPT reservoir or other wound drainage device; a debridement device (physical or ultrasonic); a cannula or infusion device (e.g. insulin infusion device); and a monitor, such as a glucose monitor. Of course, if the label is not required/desired, the first embodiment of FIG. 1 could be in incorporated similarly into a medical device. In the absence of a transparent window to attach the device to, an alternative embodiment, such as that of the second embodiment of FIGS. 2 and 3 could be used, with the underside (as illustrated) of the transfer layer 201 suitably attached that the analyte will reach it, for example incorporated into a wound dressing with the underside of the transfer layer 201 facing the wound.

Figure 7:
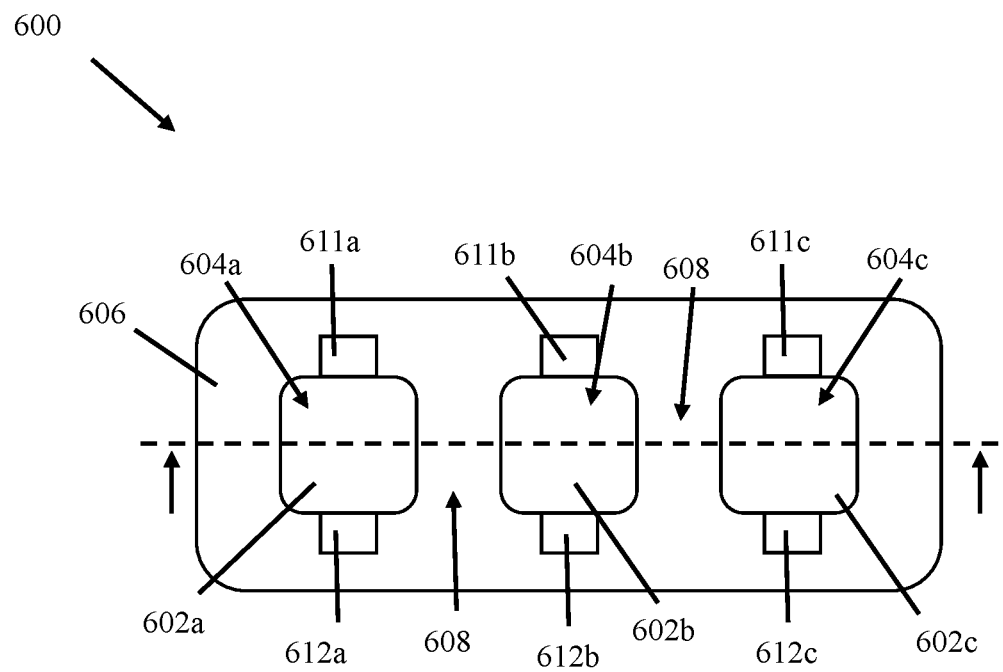
FIG. 7 is a top plan view of a fourth embodiment of a detection device.
Figure 8:
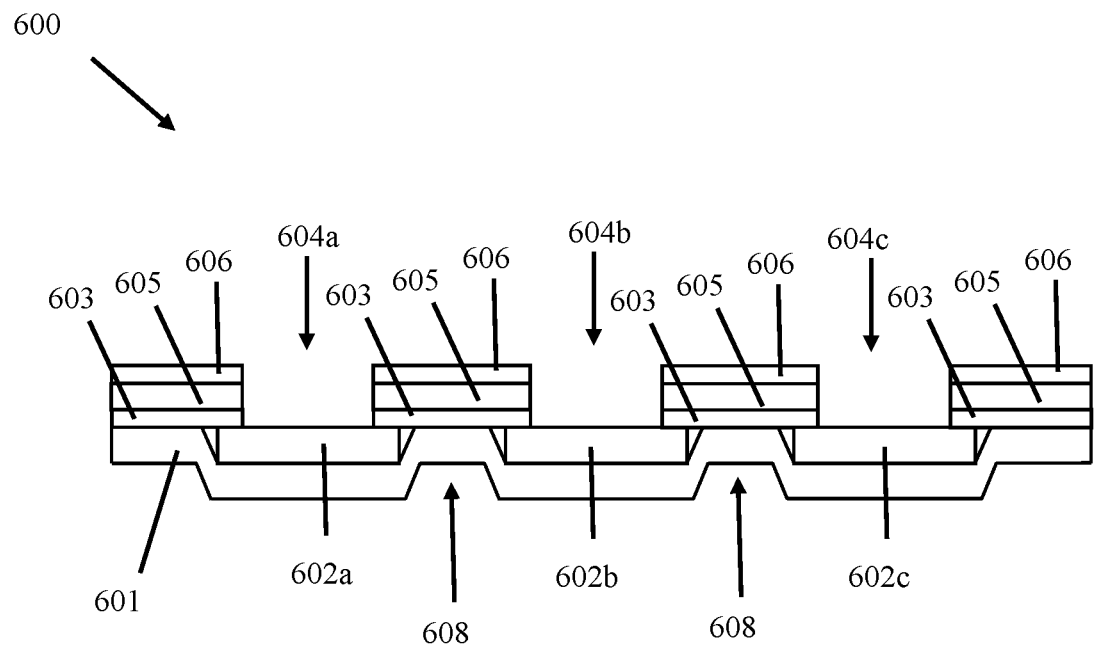
FIG. 8 is a cross-sectional view of the detection device of FIG. 7.

Referring to FIGS. 7 and 8, in a fourth embodiment of a detection device 600 like numerals are used to show like features. The detection layer of this fourth embodiment comprises three laterally spaced detection zones, each formed from a detection segment 602a-c. Furthermore, the device 600 comprises three independent observation windows 604a-c, each in register with, and corresponding to, a respective detection segment 602a-c. The device 600 is therefore a multi-detection device 600. Each of the transfer layer 601, adhesive layer 603, label 605, and outer adhesive layer 606 of the multi-detection device 600 are shared between the three detection zones respectively.

Between adjacent observation windows 604a-c and detection segments 602a-c, there is provided a gap 608 in which the adhesive layer 603 bonds to the transfer layer 601 in the spaces between the corresponding adjacent detection layer segments 602a-c. Thus, the adhesive layer 603 and transfer layer 601 are bonded together on two opposite sides of each segment 602a-c and thus, the segments forming the detection layer are retained in position in the multi-detection device 600. In other embodiments, the segments may be arranged differently, for example at points on the circumference of a circle, with gaps between adjacent segments.

In use, the transfer layer 601 receives the analyte and distributes this to the three detection layer segments 602a-c. As the transfer layer 601 is continuous between the segments, the analyte is thereby effectively distributed between the segments.

The analyte penetrates the three segments 602a-c and thus each segment detects biomarkers simultaneously and also independently of the others. Advantageously, this provides opportunity for each detection zone to be configured to conduct a different detection or test. For example, each detection zone may detect a different set of one or more biomarkers or may be a control zone, in which the segment detects the presence of the analyte and therefore whether detection of biomarkers is possible in the other detection zones.

To aid interpretation of the results, the label 605 is printed with two markings 611a-c, 612a-c either side of each detection segment 602a-c to identify each detection zone as discussed in relation to the labelled detection device 200 above. In an example, a first detection zone is labelled "T1", a second detection zone is labelled "T2", and a third detection zone is labelled "T3" by markings 612a-c on one side and A marking 611a on the other side of the first detection zone is labelled "C" to signify that it is a control zone configured to detect the presence of the analyte.

In this example, the first detection zone is configured to detect the pH of the analyte, as such it changes in colour not only in response to the presence of the analyte but also the pH of the analyte. Thus, the first detection zone has two functions: 1) it is a control zone, and accordingly any colour change in the first detection segment 602a indicates the analyte has reached the detection layer 602; and 2) it detects the presence of an infection in the analyte, and accordingly the first detection segment 602a turns dark blue if the pH detected indicates the analyte comprises an infection. The second detection zone labelled "T2" is configured to detect the biomarker neutrophil elastase, and the third detection zone labelled "T3" is configured to detect the biomarker myeloperoxidase in conjunction with glucose released by the transfer layer 601.

To manufacture the device 600, the first step is cutting glucose filter paper (or another suitable material as described herein) which will form the transfer layer 601 to a suitable size, in this embodiment it is a rectangular size to account for the three detection zones, for example 3 cm×1 cm. Next each one of the three detection strips corresponding to each detection layer segment 602a-c is cut to a suitable size to form the segment, for example a 5 mm wide strip can be cut into a 5 mm×10 mm segment. The three strips are impregnated with different biomarker detection compositions; thus, each segment will detect a different biomarker. As a particular example, the segment 602a that will form the first detection zone may be impregnated with a pH responsive composition which changes colour according to pH; the segment 602b that will form the second detection zone may be impregnated with a chromogenic composition that changes colour on detection of myeloperoxidase; and the segment 602c that will form the third detection zone may be impregnated with a chromogenic composition that changes colour on detection of neutrophil elastase. Each segment is then aligned with a 5 mm gap 608 between adjacent segments, and the 10 mm long side of each segment spanning the 1 cm side of the transfer layer 601 to form the detection layer 602.

The label 605 can be cut from a larger laminate including the adhesive and a release liner. It is cut to match the size of the transfer layer 601, with three apertures, each formed in a position corresponding to the centre of each segment 602a-c. Each aperture is smaller than the width of a segment, e.g. a 4 mm×4 mm square. The release layer is removed and the label 605 adhered by the adhesive layer 603 to the upper surfaces of the detection layer segments 602a-c, and the transfer layer 601 around the periphery of each segment 602a-c. This clamps one to the other whilst leaving the central region of each segment 602a-c free from adhesive and label 605 to form the observation windows 604a-c.

As described above, embodiments of the present invention provide for layered detection devices where the transfer and detection layers are in direct contact. This minimises any interference in the detection process caused by intermediate layers, as the analyte does not pass through any intermediate layers. Furthermore, the device comprises an observation window that facilitates unobstructed observation of any changes in the detection layer of the device caused by markers in the analyte such as biomarkers. The device has a simple construction, can be placed in a wide range of medical devices and can be scaled to perform detection of different sets of markers in the analyte simultaneously.

EXAMPLES

Example 1

Twenty-one detection devices as described above in the fourth embodiment were constructed. In this example, the transfer layer was exposed to a simulated biological sample, in this case a simulated wound fluid comprising 142 mmol sodium ions and 2.5 mmol calcium ions as chloride salts via a saturated flocked swab. The mean fluid absorption of the detection devices was measured as 15.4 mg/cm$^2$ with a standard deviation of 1.8 mg/cm$^2$. Furthermore, all devices met the requirement for the detection layer to detect one or more biomarkers in the analyte of 8.4 mg/cm$^2$ fluid absorption. This shows that the sensor devices absorb sufficient fluid to trigger a reaction in the detection strips.

Example 2

Forty-two further detection devices as described above in the fourth embodiment were constructed comprising a T2 detection zone configured to detect elastase and a T3 detection zone configured to detect myeloperoxidase.

For the first half of the devices of Example 2, 120 µl of elastase solution was applied to the transfer layer via a flocked swab and the resultant colour change of the T2 detection zone measured colorimetrically using a spectrophotometer. The percentage uptake by the detection device was compared to the known amount of enzyme applied with the swab. The mean of the devices was 85.9% with a standard deviation of 12.3% and all samples exceeded the lower limit required to trigger a valid test result of 30%. This shows that the detector constructs are capable of absorbing sufficient elastase enzyme to trigger a detection.

For the second half of the devices of Example 2 a myeloperoxidase solution was applied rather than elastase and the resultant colour change of the T3 detection zone measured colorimetrically using a spectrophotometer. The mean percentage uptake by the devices was 66.6% with a standard deviation of 6.8% and all samples exceeded the lower limit required to trigger a valid test of 30%. This shows that the detector constructs are capable of absorbing sufficient myeloperoxidase enzyme to trigger a detection.

Example 3

Two detection devices were constructed with 3 detection zones as described above in the fourth embodiment. The detection device comprises three detection zones labelled "T1", "T2" and "T3" to detect a high pH, elastase and myeloperoxidase respectively. The pH detection zone (T1) is also labelled "C" on a side distal from the "T1" label as it is also configured to function as a control zone. The pH detection zone is initially yellow and is configured to indicate the presence of the biological sample by turning green, furthermore, it is configured to indicate the presence of the biological sample at high pH by turning blue. The elastase detection zone, labelled "T2", is initially pale orange and is configured to turn dark orange/brown if the biological sample comprises the enzyme elastase. The myeloperoxidase detection zone, labelled "T3" is initially yellow and is configured to turn brown if the biological sample comprises the enzyme myeloperoxidase.

The transfer layer of the first test device of Example 3 was exposed to a biological sample of bovine serum albumin (BSA) solution at a low pH. After 5 minutes, the T1/C zone changed colour to green as the solution was present in the detection layer but not at a high pH. In addition, the T2 and T3 zones did not change colour. This shows that the device is able to detect the presence of a biological sample that does not contain one or more biomarkers.

The transfer layer of the second test device of Example 3 was exposed to a low pH solution of myeloperoxidase. After 5 minutes, the T1/C zone changed colour to green as the solution was present in the detection layer but not at a high pH and the T3 zone changed to a dark brown colour due to the myeloperoxidase in the solution In addition, the T2 zone did not change colour. This shows that the device can detect the presence of a biological sample that does not contain one or more biomarkers in one detection zone and that a different detection zone can detect a different biomarker (or biomarkers) in the biological sample simultaneously.

Example 4

Two detection devices as described in relation to Example 3 were constructed however they additionally comprised an outer adhesive layer on the outside of the label and with observation windows corresponding to the three detection zones. The detection devices were then mounted on the inside of highly polished plastic tubes via the outer adhesive layer. The resultant changes in the detection zones were then visualised through the plastic tubes.

The transfer layer of the first test device of Example 4 was exposed to a high pH solution that did not comprise detectable levels of elastase or myeloperoxidase. After 5 minutes, the T1/C detection zone changed colour to blue due to the presence of the biological sample at high pH. The T2 and T3 detection zones did not change colour. This shows that the T1/C detection zone of the device is able to detect the presence of a biological sample and also the presence of one or more biomarkers in the biological sample (e.g. an elevated pH).

The transfer layer of the second test device of Example 4 was exposed to a high pH solution comprising elastase and myeloperoxidase. After 5 minutes, the T1/C zone changed colour to blue due to the presence of the biological sample at high pH. In addition, both the T2 and T3 zones had transitioned to a dark brown colour due to the presence of elastase and myeloperoxidase in the biological sample. This shows that each detection zone can simultaneously detect different biomarkers in the biological sample.

Furthermore the test devices of Example 4 demonstrate that the detection layer/detection zones can be visualised through a plastic tube and that the detection device can be easily incorporated into a medical device.

Example 5

In a fifth test, two devices were constructed as described in the first embodiment above: a test device A and a test device B. Test device A differed from Test device B and the first embodiment in that the filter paper transfer layer was substituted for a transfer layer comprising a Pall® Vivid asymmetric polysulfone membrane of grade GF. Whole blood of concentrations up to 10% was then applied to the transfer layer of both devices. Discolouration of the sensor was prevented by filtration of the blood by the transfer layer of test device A whereas visible discolouration was observed at whole blood concentrations of 1% in test device B. This shows that a simple modification to the device can allow for colorimetric changes to be detected even in the presence of blood pigment. Blood concentrations above 10% were not tested as these are considered heavily blooded samples not suitable for colorimetric testing.

The one or more embodiments are described above by way of example only. Many variations are possible without departing from the scope of protection afforded by the appended claims.

The invention claimed is:

1. A biomarker detection device comprising:
a detection layer configured to detect one or more biomarkers in a biological sample; and
a transfer layer in direct contact with a first surface of the detection layer; and
an adhesive layer;
wherein the transfer layer is configured to deliver the biological sample directly to the detection layer and the detection layer comprises two or more detection zones;
wherein two or more observation windows are provided on a second surface of the detection layer opposite the transfer layer, each corresponding to a respective detection zone;
wherein there is no adhesive between the transfer layer and the detection layer in the region in register with the observation window and one or more gaps are provided between adjacent observation windows;
wherein the adhesive layer is bonded to the transfer layer and detection layer, and the transfer layer is bonded to the detection layer in the one or more gaps.

2. The device as claimed in claim 1 wherein the transfer layer and detection layer are bonded together at a location that is out of register with the observation window.

3. The device as claimed in claim 1, wherein the transfer layer comprises a first surface configured to receive the biological sample into the transfer layer and a second surface configured to deliver the biological sample to the detection layer, and the first surface of the detection layer is configured to receive the biological sample into the detection layer from the transfer layer, wherein at least part of the second surface of the transfer layer is in direct contact with the first surface of the detection layer.

4. The device as claimed in claim 3 wherein only part of the second surface of the transfer layer is bonded to only part of the second surface of the detection layer.

5. The device as claimed in claim 4 wherein the adhesive layer is provided on only part of the second surface of the detection layer, wherein the observation window comprises an opening in the adhesive layer.

6. The device as claimed in claim 5 wherein the device further comprises a label bonded to the second surface of the detection layer by the adhesive layer, wherein the observation window comprises an opening in the label.

7. The device as claimed in claim 6 wherein the label is stiffer and/or stronger than the adhesive layer and/or the detection layer and/or transfer layer.

8. The device as claimed in claim 5 wherein the device further comprises a fixing element configured to attach or adhere the device to another object.

9. The device as claimed in claim 8 wherein the fixing element comprises an adhesive layer and a releasable liner.

10. The device as claimed in claim 1 wherein the transfer layer is configured to filter the biological sample before it is delivered to the detection layer.

11. The device as claimed in claim 1 wherein the transfer layer is configured to release one or more reagents into the biological sample, and wherein the detection layer is configured to detect the one or more biomarkers using the one or more reagents.

12. The device as claimed in claim 1 wherein the detection layer is configured to change colour in response to the presence of one or more biomarkers in the biological sample.

13. The device as claimed in claim 1 further comprising a label bonded to the second surface of the detection layer wherein the observation windows comprise openings in the label, and the label is printed with markings corresponding to at least one detection zone.

14. The device as claimed in claim 1 wherein one of the detection zones is a control zone configured to detect the presence of the biological sample.

15. The medical device as claimed in claim 1 wherein the biomarker detection device is a swab receptacle.

16. A method of forming a biomarker detection device, the method comprising:
  providing a detection layer configured to detect one or more biomarkers in a biological sample, the detection layer comprising two or more detection zones;
  providing a transfer layer in direct contact with a first surface of the detection layer;
  providing two or more observation windows on a second surface of the detection layer opposite the transfer layer, each observation window corresponding to a respective detection zone;
  providing an adhesive layer; and
  bonding the detection layer and transfer layer together and wherein there is no adhesive between the transfer layer and the detection layer in the region in register with the observation window;
  wherein one or more gaps are provided between adjacent observation windows;
  wherein the adhesive layer is bonded to the transfer layer and the detection layer and the transfer layer is bonded to the detection layer in the one or more gaps.

17. The method as claimed in claim 16 wherein the method comprises incorporating the biomarker detection device into a swab receptacle.

* * * * *